No. 740,832.

Patented October 6, 1903.

UNITED STATES PATENT OFFICE.

FRIEDRICH ELIAS, OF PHILADELPHIA, PENNSYLVANIA, ASSIGNOR TO THE BIOGEN COMPANY, OF NEW YORK, N. Y., A CORPORATION OF NEW YORK.

PROCESS OF MAKING PEROXID OF ZINC.

SPECIFICATION forming part of Letters Patent No. 740,832, dated October 6, 1903.

Application filed November 22, 1902. Serial No. 132,417. (No specimens.)

*To all whom it may concern:*

Be it known that I, FRIEDRICH ELIAS, Ph. D., a subject of the King of Prussia, residing in Philadelphia, in the county of Philadelphia and State of Pennsylvania, have invented certain new and useful Improvements in Processes of Making Peroxid of Zinc, of which the following is a specification.

This invention relates to improvements in the manufacture of peroxid of zinc ($ZnO_2$) to be used for pharmaceutical purposes in place of zinc oxid; and the invention consists of a process of making zinc peroxid by permitting the hydrate of barium peroxid to react on a solution of a suitable zinc-salt.

It was found to be preferable to use the hydrate of the barium peroxid in a finely-divided form free of any coarse particles. This is obtained by mixing the hydrate of the barium peroxid with a suitable amount of water, allowing the mixture to stand for a suitable length of time, and then separating the fine and slimy portions of the thus formed hydrate of barium peroxid from the coarser particles. This separation may be effected by any suitable operation—for instance, by water or by screening. An experienced workman will soon determine by experiment which of the said operations will be the most suitable for his purpose. For producing from hydrated barium peroxid thus obtained the zinc peroxid may be obtained by the use of any salt of zinc soluble in water the acid radical of which forms soluble compounds with barium. A suitable salt for this purpose is chlorid of zinc, ($ZnCl_2$;) but any other salt of zinc soluble in water the acid radical of which forms with barium soluble compounds may be used, as stated.

The reaction between the hydrate of the barium peroxid and the zinc-salt may be represented by the following equation:

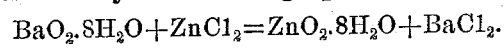

$$BaO_2.8H_2O + ZnCl_2 = ZnO_2.8H_2O + BaCl_2.$$

The process may be practically carried out in the following manner:

One kilogram of chlorid of zinc is dissolved in five liters of water, after which the solution is cooled down to a temperature of from 5 to 10° centigrade. To the cooled solution is added three-fourths of the equivalent amount of the hydrate of barium peroxid, previously brought into finely-divided form and suspended in about five liters of water. The mixture is permitted to stand for twenty-four hours and agitated from time to time. Finally the precipitate is separated from the liquid by filtration, then washed and dried.

Having thus described my invention, what I claim as new, and desire to secure by Letters Patent, is—

1. The process herein described of making peroxid of zinc, consisting in subjecting the hydrate of barium peroxid to the action of a salt of zinc the radical of which forms a soluble salt with barium, substantially as set forth.

2. The process herein described of making peroxid of zinc, consisting in subjecting the hydrate of peroxid of barium in a finely-divided form to the action of a salt of zinc the acid radical of which forms a soluble salt with barium, substantially as set forth.

3. The process herein described of making peroxid of zinc, consisting in mixing barium peroxid with water separating the coarse particles of the thus-formed hydrate of barium peroxid from the finer particles, and subjecting the latter to the action of a zinc-salt the acid radical of which forms a soluble salt with barium, substantially as set forth.

In testimony that I claim the foregoing as my invention I have signed my name in presence of two subscribing witnesses.

FRIEDRICH ELIAS.

Witnesses:
PAUL GOEPEL,
HENRY J. SUHRBIER.